(12) United States Patent
Shimada

(10) Patent No.: US 9,288,838 B2
(45) Date of Patent: *Mar. 15, 2016

(54) WIRELESS COMMUNICATION DEVICE

(71) Applicant: BROTHER KOGYO KABUSHIKI KAISHA, Nagoya-shi, Aichi-ken (JP)

(72) Inventor: Yusuke Shimada, Inazawa (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 64 days.

This patent is subject to a terminal disclaimer.

(21) Appl. No.: 13/754,643

(22) Filed: Jan. 30, 2013

(65) Prior Publication Data

US 2013/0195093 A1 Aug. 1, 2013

(30) Foreign Application Priority Data

Jan. 31, 2012 (JP) ................................. 2012-019087

(51) Int. Cl.
*H04W 76/02* (2009.01)
*H04W 84/20* (2009.01)

(52) U.S. Cl.
CPC ............ *H04W 84/20* (2013.01); *H04W 76/023* (2013.01)

(58) Field of Classification Search
None
See application file for complete search history.

(56) References Cited

U.S. PATENT DOCUMENTS

| 2006/0274355 | A1 | 12/2006 | Ferlitsch et al. |
| 2011/0225305 | A1* | 9/2011 | Vedantham ............ G06F 1/3203 709/227 |
| 2011/0261389 | A1 | 10/2011 | Ohara |
| 2011/0280152 | A1 | 11/2011 | Saito et al. |
| 2012/0134349 | A1* | 5/2012 | Jung ...................... H04W 8/005 370/338 |
| 2013/0196702 | A1 | 8/2013 | Shibata |

FOREIGN PATENT DOCUMENTS

| JP | 2010-533435 | A | 10/2010 |
| JP | 2011-244151 | A | 12/2011 |
| JP | 2012-019487 | A | 1/2012 |
| JP | 2013-519255 | A | 5/2013 |
| WO | 2009/009384 | A1 | 1/2009 |
| WO | 2011/096746 | A2 | 8/2011 |

OTHER PUBLICATIONS

Wi-FI Alliance, "Wi-Fi Alliance Technical Committee P2P Task Group: Wi-Fi Peer-to-Peer (P2P) Technical Specification," Version 1.1, 2010 (concise explanation of relevance incorporated into specification at Para. [0016]).

(Continued)

*Primary Examiner* — Hassan Phillips
*Assistant Examiner* — Ayanah George
(74) *Attorney, Agent, or Firm* — Merchant & Gould P.C.

(57) ABSTRACT

A wireless communication device may establish a first type of connection by using a first wireless channel. The wireless communication device may establish the second type of connection by using a second wireless channel. In a specific case where one of the first type of connection with the first device and the second type of connection with the second device is to be established under a situation in which the other has been established, the wireless communication device may determine at least one of a value of the first wireless channel and a value of the second wireless channel such that the value of the first wireless channel is identical to the value of the second wireless channel.

18 Claims, 7 Drawing Sheets

(56) References Cited

OTHER PUBLICATIONS

Office Action issued in related U.S. Appl. No. 13/754,712, mailed Apr. 28, 2015.
Office Action issued in related Japanese application No. 2012-019089, Nov. 27, 2015.
U.S. Notice of Allowance issued in related U.S. Appl. No. 13/754,712, mailed Nov. 6, 2015.
Office Action issued in Japanese Patent Application No. 2012-019087, mailed Nov. 4, 2015.

* cited by examiner (First and Second Embodiments)

WIRELESS COMMUNICATION DEVICE

CROSS-REFERENCE TO RELATED APPLICATIONS

This application claims priority to Japanese Patent Application No. 2012-019087, filed on Jan. 31, 2012, the contents of which are hereby incorporated by reference into the present application.

TECHNICAL FIELD

A technique disclosed in the present specification relates to a wireless communication device.

DESCRIPTION OF RELATED ART

Wi-Fi Direct (called "WFD" below) formulated by Wi-Fi Alliance is known. A WFD wireless network includes one apparatus operating as a Group Owner (called "G/O apparatus" below), and one or more apparatuses operating as clients administered by the G/O apparatus (called "client apparatus" below). In a case where a connection according to WFD is to be established between a pair of apparatuses, each of the pair of apparatuses executes a G/O negotiation, and determines whether it is to operate as the G/O or the client.

SUMMARY

The present specification presents a technique that, in a state where a wireless communication device is to establish connections with a plurality of devices, may allow the wireless communication device to form an appropriate connection state.

One aspect disclosed in the present specification may be a wireless communication device configured to operate selectively in one of a plurality of states comprising a parent station state which functions as a parent station of a wireless network and a child station state which functions as a child station of the wireless network. The wireless communication device may comprise: a processor, and a memory storing computer-readable instructions therein. The computer-readable instructions, when executed by the processor, may cause the wireless communication device to perform: (A) executing a state determination process of determining that one of the wireless communication device and another device is to operate in the parent station state and determining that the other of the wireless communication device and the other device is to operate in the child station state, so as to establish a first type of connection with the other device such that the wireless communication device operates in a state determined in the state determination process, wherein in a case where the first type of connection with a first device is to be established, the first type of connection with the first device is established by using a first wireless channel; (B) establishing a second type of connection with another device, wherein in a case where the second type of connection with a second device different from the first device is to be established, the second type of connection with the second device is established by using a second wireless channel; and (C) determining at least one of a value of the first wireless channel and a value of the second wireless channel such that the value of the first wireless channel is identical to the value of the second wireless channel, in a specific case where one of the first type of connection with the first device and the second type of connection with the second device is to be established under a situation in which the other of the first type of connection with the first device and the second type of connection with the second device has been established.

Moreover, a control method, a computer program, and a non-transitory computer-readable medium that stores computer-readable instructions, all for realizing the wireless communication device, are also novel and useful.

EMBODIMENT

First Embodiment (Configuration of System)

Figure 1:
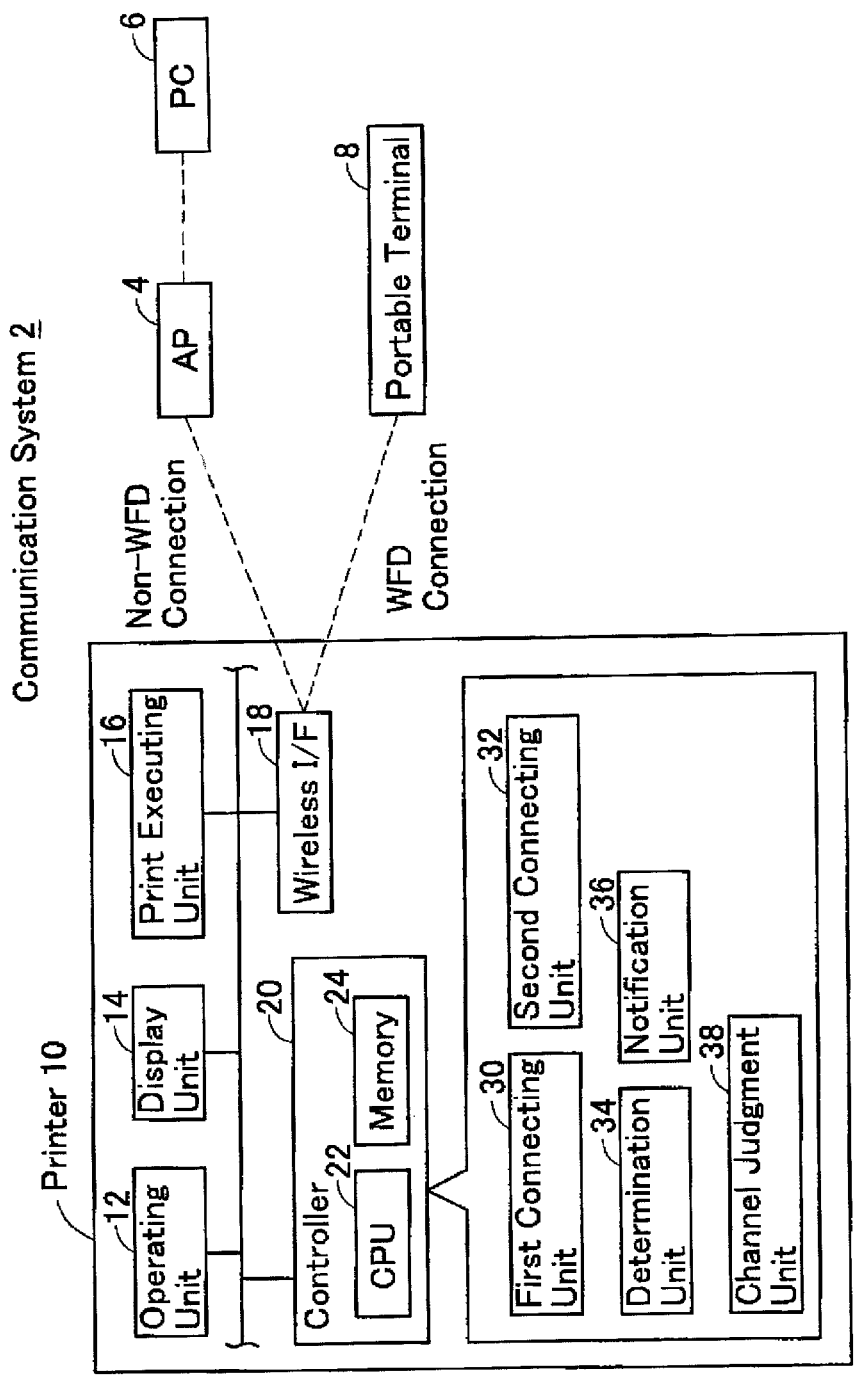
FIG. 1 shows an example of a configuration of a communication system.

As shown in FIG. 1, a communication system 2 comprises an access point (called "AP" below) 4, a PC 6, a portable terminal 8, and a printer 10 (a peripheral apparatus of the PC 6, the portable terminal 8, etc.). The portable terminal 8 and the printer 10 are each capable of executing a wireless communication function in accordance with Wi-Fi Direct (to be described). Moreover, below, Wi-Fi Direct is called "WFD", and a connection in accordance with WFD is called a "WFD connection". The printer 10 is capable of establishing a WFD connection with the portable terminal 8, thereby constructing a WFD network. Consequently, the portable terminal 8 and the printer 10 become capable of wirelessly communicating object data that is a communication object such as print data, etc.

In addition to the wireless communication function in accordance with the WFD, the printer 10 is capable of executing a normal wireless communication function (e.g., wireless communication according to IEEE802.11). That is, the printer 10 is capable of establishing a connection with the AP 4 (called "non-WFD connection" below), thereby constructing a non-WFD network. Moreover, the PC 6 is also capable of establishing a non-WFD connection with the AP 4. Consequently, the printer 10 and the PC 6 become capable of wirelessly communicating the object data that is the communication object such as the print data, etc. via the AP 4.

In the present embodiment, a state is assumed in which the AP 4, the PC 6 and the printer 10 are stationary within, for example, a specific company. That is, a non-WFD network that includes the AP 4, the PC 6 and the printer 10 is constructed in the specific company. Consequently, a user of the PC 6 (e.g. an employee of the specific company) can execute printing on the printer 10 via the AP 4. A user of, for example, the portable terminal 8 (e.g. a visitor to the specific company) can temporarily establish the WFD connection between the portable terminal 8 and the printer 10. That is, the user of the portable terminal 8 can temporarily construct a WFD network that includes the portable terminal 8 and the printer 10. Thereby, the user of the portable terminal 8 can execute printing on the printer 10 without going through the AP 4.

Thus, in the present embodiment, a state is assumed in which the non-WFD network is a network that is to remain constructed constantly, and the WFD network is a network that is to be constructed temporarily.

(Configuration of Printer 10)

The printer 10 comprises an operating unit 12, a display unit 14, a print executing unit 16, a wireless interface 18, and a controller 20. The units 12 to 20 are connected with a bus line (reference number omitted). The operating unit 12 includes a plurality of keys. The user can give various instructions to the printer 10 by operating the operating unit 12. The display unit 14 is a display for displaying various information. The print executing unit 16 comprises a printing mechanism such as an ink jet method, laser method, etc. printing mechanism, and executes printing according to an instruction from the controller 20.

The wireless interface 18 is an interface used when the controller 20 executes a wireless communication. The wireless interface 18 is physically one interface. However, a MAC address to be used in the WFD connection and a MAC address to be used in the non-WFD connection are both assigned to the wireless interface 18. Consequently, by using the wireless interface 18, the controller 20 may simultaneously execute both the wireless communication function in accordance with WFD and the normal wireless communication function. Consequently, as will be described in detail later, the controller 20 may form a state in which both the WFD connection and the non-WFD connection have been established.

The controller 20 comprises a CPU 22 and a memory 24. The CPU 22 executes various processes according to programs stored in the memory 24. The memory 24 includes a ROM, RAM, hard disk, etc. The memory 24 stores the programs executed by the CPU 22, and stores data acquired or created in the course of the CPU 22 performing processes. The CPU 22 realizes the functions of a first connecting unit 30, a second connecting unit 32, a determination unit 34, a notification unit 36, and a channel judgment unit 38 by executing processes according to the programs.

As will be described in detail later, the first connecting unit 30 is a unit for executing the wireless communication function in accordance with WFD. For example, the first connecting unit 30 establishes a WFD connection with the portable terminal 8. Further, the second connecting unit 32 is not a unit for executing the wireless communication function in accordance with WFD, but is a unit for executing the normal wireless communication function. For example, the second connecting unit 32 establishes a non-WFD connection with the AP 4.

(Configuration of PC 6)

The PC 6 is not capable of executing a wireless communication function in accordance with the WFD. However, in a variant, the PC 6 may be capable of executing, the wireless communication function in accordance with the WFD. The PC 6 can establish the non-WFD connection with the AP 4. The PC 6 comprises a CPU, memory, display, etc. (not shown). The memory of the PC 6 stores a printer driver program for the printer 10. The CPU of the PC 6 can create print data that is a printing object by using the printer driver program. In a state where the non-WFD connection has been established between the printer 10 and the AP 4, and the non-WFD connection has also been established between the PC 6 and the AP 4, the PC 6 can wirelessly send the print data to the printer 10 via the AP 4.

(Configuration of Portable Terminal 8)

The portable terminal 8 is a portable terminal including, for example, a Smart Phone, PDA terminal, notebook PC, tablet PC, etc. The portable terminal 8 is capable of executing a wireless communication function in accordance with the WFD. The portable terminal 8 is capable of establishing the WFD connection with the printer 10. The portable terminal 8 comprises a CPU, memory, display, etc. (not shown). The memory of the portable terminal 8 stores a printer driver program for the printer 10. The CPU of the portable terminal 8 can create the print data that is a printing object by using the printer driver program. In a state where the WFD connection has been established between the printer 10 and the portable terminal 8, the portable terminal 8 can wirelessly send the print data to the printer 10 without going through the AP 4.

(WFD)

The WFD is a standard formulated by Wi-Fi Alliance. The WFD is described in "Wi-Fi Peer-to-Peer (P2P) Technical Specification Version1.1" created by Wi-Fi Alliance.

As described above, the printer 10 and the portable terminal 8 are each capable of executing the wireless communication function in accordance with the WFD. Below, an apparatus capable of executing the wireless communication function in accordance with the WFD is called a "WFD-compatible apparatus". According to the WFD standard, three states are defined as the states of the WFD-compatible apparatus: Group Owner state (called "G/O state" below), client state, and device state. The WFD-compatible apparatus is capable of selectively operating in one state among the three states.

One WFD network includes an apparatus in the G/O state and an apparatus in the client state. Only one G/O state apparatus may be present in one WFD network, but one or more client state apparatuses may be present. The G/O state apparatus manages the one or more client state apparatuses. Specifically, the G/O state apparatus creates an administration list in which identification information (i.e., MAC address) of each of the one or more client state apparatuses is written. When a client state apparatus newly participates in the WFD network, the G/O state apparatus adds the identification information of that apparatus to the administration list, and when the client state apparatus leaves the WFD network, the G/O state apparatus deletes the identification information of that apparatus from the administration list.

The G/O state apparatus is capable of wirelessly communicating object data that is a communication object (e.g., data that includes network layer information of the OSI reference model (print data, etc.)) with an apparatus registered in the administration list, i.e., with the client state apparatus. However, with an apparatus not registered in the administration list, the G/O state apparatus is capable of wirelessly communicating data for participating in the WFD network (e.g., data that does not include network layer information (physical layer data such as a Probe Request signal, Probe Response signal, etc.)) but is not capable of wirelessly communicating the object data. For example, the printer 10 that is in the G/O state is capable of wirelessly receiving print data from the portable terminal 8 that is registered in the administration list (i.e., the portable terminal 8 that is in the client state), but is not capable of wirelessly receiving print data from the apparatus that is not registered in the administration list.

Further, the G/O state apparatus is capable of relaying the wireless communication of object data (print data, etc.) between a plurality of client state apparatuses. For example, in a case where the portable terminal 8 that is in the client state should wirelessly send the print data to another printer that is in the client state, the portable terminal 8 first wirelessly sends the print data to the printer 10 that is in the G/O state. In this case, the printer 10 wirelessly receives the print data from the portable terminal 8, and wirelessly sends the print data to the other printer. That is, the G/O state apparatus is capable of executing the function of an AP (access point) of a wireless network.

Moreover, a WFD-compatible apparatus that is not participating in the WFD network (i.e., an apparatus not registered in the administration list) is a device state apparatus. The device state apparatus is capable of wirelessly communicating data for participating in the WFD network (physical layer data such as a Probe Request signal, Probe Response signal, etc.), but is not capable of wirelessly communicating the object data (print data, etc.) via the WFD network.

Figure 2:
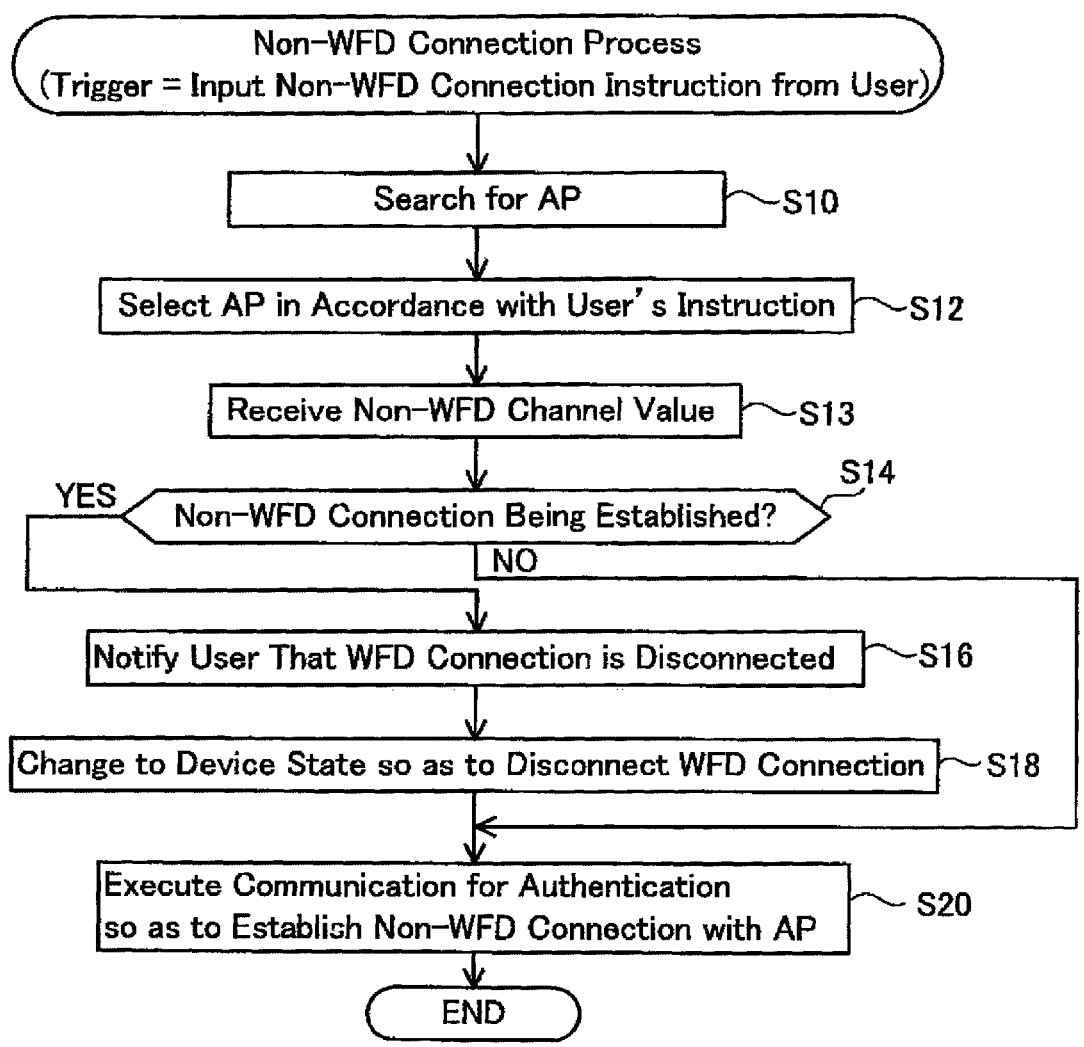
FIG. 2 shows a flowchart of a non-WFD connection process.

(Non-WFD Connection Process; FIG. 2)

Next, the contents of a process executed by the printer 10 will be described. First, the contents of a non-WFD connection process executed by the printer 10 will be described with reference to FIG. 2. In the case where the user inputs a predetermined non-WFD connection instruction to the operating unit 12, the controller 20 starts the non-WFD connection process of FIG. 2.

In S10, the second connecting unit 32 executes a Scan process for searching for APs present in the surroundings of the printer 10. Next, in S12, the second connecting unit 32 displays, on the display unit 14, an AP list including information (e.g., SSID, etc.) relating to the APs found in the Scan process. The user of the printer 10 specifies, from within the AP list, the AP with which the printer 10 is to establish a connection. The second connecting unit 32 selects the AP in accordance with the instruction of the user. Below, the description will continue using, as an example, a case where the AP 4 was selected.

As will be described in detail later, the first connecting unit 30 executes a G/O negotiation (see S42, etc. of FIG. 3), establishing the WFD connection. By contrast, the second connecting unit 32 does not execute the G/O negotiation. The AP 4 determines, from among 1 to 14 ch, the value of the wireless channel to be used in the non-WFD connection (called "non-WFD channel value Vap" below). The AP 4 sends the non-WFD channel value Vap to the printer 10. Consequently, in S13 the second connecting unit 32 receives the non-WFD channel value Vap from the AP 4. The second connecting unit 32 stores the non-WFD channel value Vap in the memory 24.

Next, in S14 the second connecting unit 32 judges whether the WFD connection between the printer 10 and the portable terminal 8 has been established. In a case where the WFD connection has been established (the case of YES in S14), the process proceeds to S16, and in a case the WFD connection has not been established (the case of NO in S14), the process proceeds to S20.

In S20, using the non-WFD channel value Vap received in S13, the second connecting unit 32 executes communication for authentication with the AP 4. In the communication executed at this occasion, the second connecting unit 32 sends data of an authentication mode, encryption mode, password, etc. to the AP 4. Thereby, the AP 4 executes the authentication of the authentication mode, encryption mode, password, etc. and, if the authentication succeeds, sends data to the printer 10 indicating that the authentication succeeded. Thereby, the non-WFD connection is established between the printer 10 and the AP 4. Consequently, using the non-WFD channel value Vap, the printer 10 (i.e., the second connecting unit 32) can execute the communication of the object data (print data, etc.) that is the communication object with the PC 6 via the AP 4. When S20 ends, the non-WFD connection process of FIG. 2 ends.

On the other hand, in S16 the second connecting unit 32 displays, on the display unit 14, information indicating that the WFD connection with the portable terminal 8 is disconnected. Next, in S18 the first connecting unit 30 changes the state of the printer 10 from the G/O state or client state to the device state. For example, in the case where the current state of the printer 10 is the G/O state, the first connecting unit 30 deletes, from the memory 24, the administration list that is being stored by the printer 10 that is in the G/O state, and the value of the wireless channel currently being used in the WFD connection (called "WFD channel value Vwfd" below). Thereby, the printer 10 moves from the G/O state to the device state, and consequently the WFD connection between the printer 10 and the portable terminal 8 is disconnected. Further, e.g., in the case where the current state of the printer 10 is the client state, the first connecting unit 30 deletes the WFD channel value Vwfd from the memory 24. Thereby, the printer 10 moves from the client state to the device state, and consequently the WFD connection between the printer 10 and the portable terminal 8 is disconnected.

When S18 ends, in S20 the second connecting unit 32 establishes a non-WFD connection with the AP 4 by using the non-WFD channel value Vap received in S13, in the same manner as described above. Since the WFD connection with the portable terminal 8 was disconnected in S18, a state is formed in which only the non-WFD connection with the AP 4 has been established.

For example, in the case where the WFD connection with the portable terminal 8 has been established (the case of YES in S14), it is conceivable to adopt a configuration that forms a state in which both the WFD connection with the portable terminal 8 and the non-WFD connection with the AP 4 are established without the WFD connection with the portable terminal 8 being disconnected. However, the wireless interface 18 is, physically, one interface. Consequently, in a case where the WFD channel value Vwfd and the non-WFD channel value Vap are different, the printer 10 could not, simultaneously, appropriately execute the wireless communication using the WFD connection and the wireless communication using the non-WFD connection. To avoid this type of situation occurring, a configuration is adopted in the present embodiment in which, in the case of YES in S14, the WFD connection with the portable terminal 8 is disconnected (S18), and a state is formed where only the non-WFD connection with the AP 4 is established.

Moreover, in the case where the WFD connection has been established (the case of YES in S14), it is conceivable to adopt a configuration that maintains the WFD connection with the portable terminal 8 without establishing the non-WFD connection with the AP 4, (i.e., a configuration that forms a state where only the WFD connection with the portable terminal 8 is established). However, as described above, the non-WFD network is a network that is to remain constructed constantly, and if this type of network is disconnected, the user of the PC 6 can no longer execute printing on the printer 10. In order to prevent such an event from occurring, a configuration is adopted in the present embodiment where, in the case of YES in S14, the WFD connection that is to be established temporarily with the portable terminal 8 is disconnected, and a state is formed where only the non-WFD connection that is to remain established constantly with the AP 4 is established. That is, in the present embodiment, a configuration is adopted which gives priority to the non-WFD connection with the AP 4 that is to remain established constantly.

Figure 3:
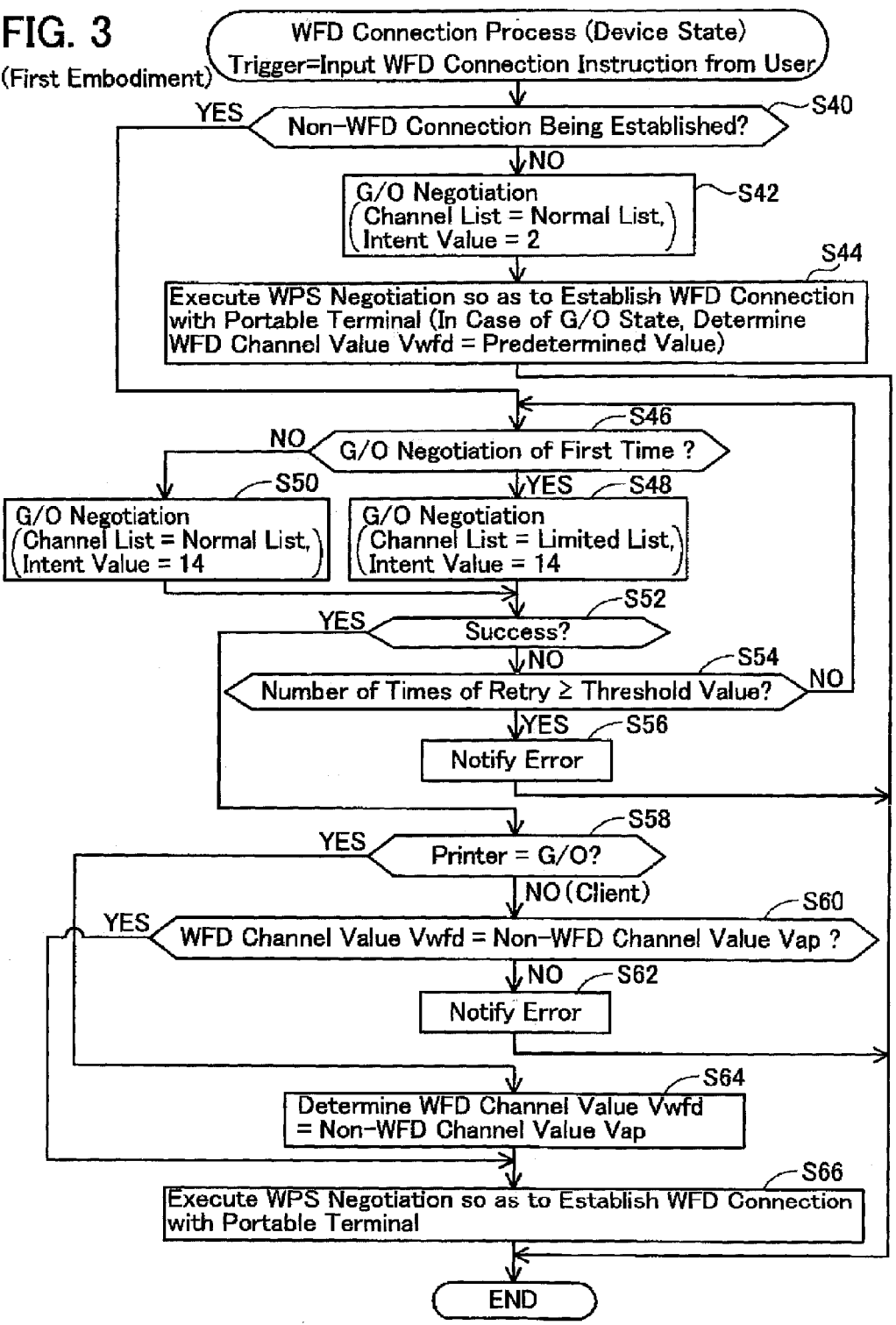
FIG. 3 shows a flowchart of a WFD connection process.

(WFD Connection Process; FIG. 3)

Next, the contents of the WFD connection process executed by the printer 10 that is in the device state will be described with reference to FIG. 3. When the user inputs a predetermined WFD connection instruction to the operating unit 12, the controller 20 starts the WFD connection process of FIG. 3.

In S40, the first connecting unit 30 judges whether the non-WFD connection has been established between the printer 10 and the AP 4. In the case where the non-WFD connection has been established (the case of YES in S40), the process proceeds to S46, and in the case the non-WFD connection has not been established (the case of NO in S40), the process proceeds to S42.

Moreover, although not shown in the flowchart of FIG. 3, in either cases of YES and NO in S40, the first connecting unit 30 executes a Search process for searching for device state apparatuses (e.g., the portable terminal 8) present in the surroundings of the printer 10. Further, the first connecting unit 30 displays, on the display unit 14, an apparatus list that includes information relating to the apparatuses found in the Search process (e.g., device name, model name, MAC address etc.). The user of the printer 10 specifies, from the apparatus list, the apparatus which is to establish the connection with the printer 10. The first connecting unit 30 selects the apparatus in accordance with the instruction of the user. Below, the description will continue using a case, as an example, where the portable terminal 8 was selected.

Further, in the case where the WFD connection instruction is input to the portable terminal 8, the portable terminal 8 that is in the device state executes a Search process, as in the case of the printer 10. Thereby, an apparatus list that includes information relating to the printer 10 is displayed on a display unit of the portable terminal 8. The user of the portable terminal 8 selects, from the apparatus list, the apparatus which is to establish a connection with the portable terminal 8. Below, the description will continue using a case, as an example, where the printer 10 was selected.

In S42, the first connecting unit 30 executes G/O negotiation, determining one apparatus from among the printer 10 and the portable terminal 8 as the G/O, and determining the other apparatus from among the printer 10 and the portable terminal 8 as the client. Specifically, the first connecting unit 30 first sends, to the portable terminal 8, an Intent value of the printer 10 that is being stored in the memory 24. Further, the first connecting unit 30 receives, from the portable terminal 8, the Intent value of the portable terminal 8 that is being stored in the portable terminal 8. The Intent value is a setting value indicating the degree to which an apparatus should become the G/O. The Intent value is any value within a numerical value range of 0 to 15. The greater the Intent value, the higher the possibility of becoming the G/O. In other words, the smaller the Intent value, the higher the possibility of becoming the client.

For example, an apparatus in which the capacity of the CPU and the memory is comparatively high (e.g. a PC) can execute another process rapidly while operating as the G/O. Consequently, a comparatively large Intent value is usually set in this type of apparatus so that it has a high possibility of becoming the G/O. On the other hand, e.g., an apparatus in which the capacity of the CPU and the memory is comparatively low might be unable to execute another process while operating as the G/O. Consequently, a comparatively low Intent value is usually set in this type of apparatus so that it has a low possibility of becoming the G/O (i.e., so that it has a high possibility of becoming the client).

In the present embodiment, "2" is used as the Intent value of the printer 10 (i.e., a default Intent value) in the G/O negotiation of S42. The printer 10 usually has a comparatively low CPU and memory capacity compared to a PC, etc. Consequently, a comparatively small default Intent value is set in the printer 10. Consequently, in S42 the first connecting unit 30 sends the Intent value "2" of the printer 10 to the portable terminal 8.

In S42, the first connecting unit 30 further compares the Intent value of the printer 10 and the Intent value of the portable terminal 8, and determines the G/O and the client. For example, in the case where the Intent value of the printer 10 is greater than the Intent value of the portable terminal 8, the first connecting unit 30 determines that the printer 10 should become the G/O, and determines that the portable terminal 8 should become the client. Further, e.g., in the case where the Intent value of the printer 10 is smaller than the Intent value of the portable terminal 8, the first connecting unit 30 determines that the printer 10 should become the client, and determines that the portable terminal 8 should become the G/O. Moreover, in the case where the Intent value of the printer 10 and the Intent value of the portable terminal 8 are identical, the first connecting unit 30 may change the Intent value of the printer 10 and then re-execute the G/O negotiation using the changed Intent value, may display, on the display unit 14, information indicating that a WFD connection cannot be established, or may, randomly, determine that the printer 10 should become one of the G/O and the client, and determine that the portable terminal 8 should become the other of the G/O and the client.

The portable terminal 8 determines the G/O and the client based on the Intent value of the printer 10 and the Intent value of the portable terminal 8 using the same method as the printer 10.

Moreover, during the course of the G/O negotiation of S42, the notification unit 36 notifies (i.e., sends) the portable terminal 8 of a channel list (called "normal list" below) that includes all the values 1 to 14 ch as the values of the wireless channels that the printer 10 can use in the WFD connection. Similarly, the portable terminal 8 notifies (i.e., sends) the printer 10 of a channel list that includes the values of the wireless channels that the portable terminal 8 can use in the WFD connection. Thereby, the first connecting unit 30 can acquire the channel list of the portable terminal 8. When the G/O negotiation of S42 ends, the process proceeds to S44.

In S44, a process is executed in accordance with the results of the G/O negotiation of S42. For example, in the case where it is determined that the printer 10 is to become the G/O, in S44 the determination unit 34 determines the WFD channel value Vwfd to be used in the WFD connection. Specifically, the determination unit 34 determines, as a WFD channel value Vwfd, one wireless channel value included in the channel list notified from the portable terminal 8 in S42, from among the wireless channel values (1 to 14 ch) included in the normal list notified to the portable terminal 8 in S42. In the present embodiment, if "11 ch" is included in the channel list notified from the portable terminal 8, the determination unit 34 determines "11 ch" as the WFD channel value Vwfd. However, if "11 ch" is not included in the channel list notified from the portable terminal 8, the determination unit 34 determines another value (e.g., "10 ch") as the WFD channel value Vwfd.

Next, the first connecting unit 30 sends (i.e., notifies) the determined WFD channel value Vwfd to the portable terminal 8. Thereby, the portable terminal 8 can learn the WFD channel value Vwfd, and can use the WFD channel value Vwfd in subsequent communication. Moreover, the first connecting unit 30 stores the determined WFD channel value Vwfd in the memory 24 of the printer 10.

On the other hand, in the case where it is determined that the printer 10 is to become the client, in S44 the determination unit 34 does not determine the WFD channel value Vwfd. In this case, the first connecting unit 30 receives, from the portable terminal 8 that is in the G/O state, the WFD channel value Vwfd determined by the portable terminal 8. In this case, the first connecting unit 30 stores the received WFD channel value Vwfd in the memory 24 of the printer 10.

In S44, further, the first connecting unit 30 executes a WPS (Wi-Fi Protected Setup) negotiation, establishing a WFD connection with the portable terminal 8. Moreover, in the case where it was determined that the printer 10 is to become the G/O, the first connecting unit 30 executes WPS negotiation for the G/O state. On the other hand, in the case where it was determined that the printer 10 is to become the client, the first connecting unit 30 executes WPS negotiation for the client state.

(WPS Negotiation for G/O State)

In the WPS negotiation for the G/O state, the first connecting unit 30 creates data representing a wireless profile (SSID, authentication mode, encryption mode, password etc.) which is needed to establish a WFD connection. Moreover, the authentication mode and encryption mode are predetermined. Further, the first connecting unit 30 creates the password at the time of the process S44. Moreover, the SSID may be created by the first connecting unit 30 at the time of the process S44, or may be predetermined. Next, using the WFD channel value Vwfd, the first connecting unit 30 sends the data representing the wireless profile to the portable terminal 8.

Sending the wireless profile to the portable terminal 8 from the printer 10 allows the printer 10 and the portable terminal 8 to use the same wireless profile. Using the wireless profile, the first connecting unit 30 executes the wireless communication (called "specific wireless communication" below) of an Authentication Request, Authentication Response, Association Request, Association Response, and 4way handshake with the portable terminal 8. Moreover, the WFD channel value Vwfd is used in the specific wireless communication as well. Various authentication processes such as authentication of SSID, authentication of authentication mode and encryption mode, authentication of password, etc. are executed during the course of the specific wireless communication. In a case where all the authentications succeed, a WFD connection is established between the printer 10 and the portable terminal 8.

Next, the first connecting unit 30 adds identification information of the portable terminal 8 (i.e., the MAC address of the portable terminal 8) to the administration list. Thereby, by using the WFD channel value Vwfd, it becomes possible for the printer 10 that is in the G/O state (i.e., the first connecting unit 30) to communicate the object data (print data, etc.) that is the communication object with the portable terminal 8 that is in the client state. Moreover, the object data includes network layer data, which is a layer higher than the physical layer of the OSI reference model. Consequently, the printer 10 that is in the G/O state (i.e., the first connecting unit 30) can execute wireless communication of the network layer with the portable terminal 8 that is in the client state. Further, it becomes possible for the printer 10 that is in the G/O state (i.e., the first connecting unit 30) to relay wireless communication between the portable terminal 8 that is in the client state and another apparatus which is in the client state and is registered in the administration list.

As described above, in the case where it is determined in the G/O negotiation that the printer 10 is to become the G/O, the first connecting unit 30 establishes the WFD connection with the portable terminal 8 by using the WFD channel value Vwfd so that the printer 10 operates in the G/O state.

(WPS Negotiation for Client State)

On the other hand, in the WPS negotiation for the client state, the first connecting unit 30 receives the data representing the wireless profile from the portable terminal 8 by using the WFD channel value Vwfd. Next, using the wireless profile, the first connecting unit 30 executes the specific wireless communication with the portable terminal 8. Thereby, the WFD connection between the printer 10 and the portable terminal 8 is established.

Moreover, the portable terminal 8 adds identification information of the printer 10 (i.e., the MAC address of the printer 10) to the administration list. Thereby, by using the WFD channel value Vwfd, it becomes possible for the printer 10 that is in the client state (i.e., the first connecting unit 30) to communicate the object data (print data, etc.) that is the communication object with the portable terminal 8 that is in the G/O state.

As described above, in the case where it is determined in the G/O negotiation that the printer 10 is to become the client, the first connecting unit 30 establishes the WFD connection with the portable terminal 8 by using the WFD channel value Vwfd so that the printer 10 operates in the client state. When S44 ends, the WFD connection process of FIG. 3 ends.

Next, the contents of processes from S46 onwards, which are executed in the case of YES in S40 (the case where the non-WFD connection is currently established) will be described. In S46, the first connecting unit 30 judges whether a situation in which G/O negotiation is to be executed has occurred for a first time since the WFD connection process of FIG. 3 has started. In the case where a situation has occurred in which G/O negotiation is to be executed for the first time (the case of YES in S46), the process proceeds to S48, and in the case where a situation has occurred in which G/O negotiation is to be executed for a second or subsequent time (the case of NO in S46), the process proceeds to S50.

In S48, the first connecting unit 30 executes the G/O negotiation in the same manner as in S42. However, the G/O negotiation of S48 differs from S42 in the following points. In the G/O negotiation of S48, "14" is adopted as the Intent value of the printer 10. Consequently, in S48, the first connecting unit 30 sends the Intent value "14" of the printer 10 to the portable terminal 8. Further, in S48, the notification unit 36 notifies (i.e., sends) the portable terminal 8 of a channel list (called "limited list" below), this including only the non-WFD channel value Vap (i.e., the non-WFD channel value Vap within the memory 24) used in the non-WFD connection that is currently established, as the wireless channel value that the printer 10 can use in the WFD connection. When the G/O negotiation of S48 ends, the process proceeds to S52.

In S52, the first connecting unit 30 judges whether the G/O negotiation has succeeded. For example, when a communication environment between the printer 10 and the portable terminal 8 is not so desirably established, the communication for the G/O negotiation between the printer 10 and the portable terminal 8 cannot be executed. In this case, the first connecting unit 30 judges NO in S52. Further, e.g., in the case where the portable terminal 8 is notified of the limited list (i.e., the non-WFD channel value Vap) in the G/O negotiation of S48, a following event could occur. In a case where the non-WFD channel value yap is not included in the channel list notified from the portable terminal 8, the printer 10 and the portable terminal 8 cannot use a common wireless channel. Consequently, in this case, also, the first connecting unit 30 judges NO in S52. In the case of NO in S52, the process proceeds to S54.

In S54, the first connecting unit 30 judges whether the number of times of executing the G/O negotiation is greater than or equal to a threshold value (the threshold value is an integer greater than or equal to 2). In the case where the number of times of executing the G/O negotiation is greater than or equal to the threshold value (the case of YES in S54), in S56 the first connecting unit 30 displays, on the display unit 14, information indicating that the WFD connection cannot be established. In this case, the first connecting unit 30 does not establish a WFD connection with the portable terminal 8. Consequently, a state is maintained where only the non-WFD connection with the AP 4 has been established. When S56 ends, the WFD connection process of FIG. 3 ends.

On the other hand, in the case where the number of times of executing the G/O negotiation is less than the threshold value (the case of NO in S54), the process returns to S46. In this case, the first connecting unit 30 judges NO in S46, and proceeds to S50.

In S50, the first connecting unit 30 executes the G/O negotiation in the same manner as in S42. However, in the G/O negotiation of S50, "14" is adopted as the Intent value of the printer 10. Consequently, in S50 the first connecting unit 30 sends the Intent value "14" of the printer 10 to the portable terminal 8. Moreover, in S50, the notification unit 36 notifies the portable terminal 8 of the normal list (1 to 14 ch). That is, in the case where the G/O negotiation of S48 did not succeed, the notification unit 36 notifies the portable terminal 8 of a value different from the non-WFD channel value Vap.

Moreover, in a variant, in S48 and S50 the first connecting unit 30 may use a value different from "14" (e.g "13", "15" etc.) as the Intent value of the printer 10. That is, in S48 and S50 the first connecting unit 30 may use an Intent value greater than the Intent value of the printer 10 (i.e., the default Intent value) used in S42.

As described above, in the G/O negotiation of S48, the limited list is notified to the portable terminal 8, and consequently NO may be judged in S52. In this case, the G/O negotiation of S50 is re-executed, and the normal list instead of the limited list is notified to the portable terminal 8. Consequently, YES may be judged in S52. In the case of YES in S52, the process proceeds to S58.

In S58, the first connecting unit 30 judges whether it was determined, in the G/O negotiation of S48 or S50, that the printer 10 is to become the G/O. Since the Intent value "14" of the printer 10 is used, it is usually determined in the G/O negotiation of S48 or S50 that the printer 10 is to become the G/O. In this case, the first connecting unit 30 judges YES in S58, and proceeds to S64.

In S64, by referring to the non-WFD channel value Vap that is being used in the non-WFD connection that is currently established (i.e., the non-WFD channel value Vap within the memory 24), the determination unit 34 determines the WFD channel value Vwfd that is identical to the non-WFD channel value Vap. Thereupon, the determination unit 34 sends (i.e., notifies) the determined WFD channel value Vwfd to the portable terminal 8. Moreover, the first connecting unit 30 stores the determined WFD channel value Vwfd in the memory 24 of the printer 10. As described above, in S64 the WFD channel value Vwfd is determined such that the WFD channel value Vwfd and the non-WFD channel value Vap are identical. Thereby, it is possible to appropriately execute communication using the WFD connection and communication using the non-WFD connection simultaneously.

In S66, which is executed after S64, the first connecting unit 30 executes WPS negotiation for the G/O state. Thereby, using the WFD channel value Vwfd determined in S64, the first connecting unit 30 establishes a WFD connection with the portable terminal 8. Since a non-WFD connection with the AP 4 has already been established, a state is formed in which both a non-WFD connection with the AP 4 and a WFD connection with the portable terminal 8 have been established. Thereby, the WFD connection process of FIG. 3 ends.

On the other hand, in the case where the Intent value of the portable terminal 8 is "15", it is determined in the G/O negotiation of S48 or S50 that the printer 10 is to become the client. In this case, the first connecting unit 30 judges NO in S58, and the process proceeds to S60.

In S60, the first connecting unit 30 receives, from the portable terminal 8 that is in the G/O state, the WFD channel value Vwfd determined by the portable terminal 8. Thereupon, the channel judgment unit 38 judges whether the received WFD channel value Vwfd is identical to the non-WFD channel value yap being used by the non-WFD connection that is currently established.

For example, the limited list is notified to the portable terminal 8 in the G/O negotiation of S48 and consequently, in the case where the G/O negotiation of S48 has succeeded, the portable terminal 8 determines the WFD channel value Vwfd as a value identical to the non-WFD channel value Vap included in the limited list. In this case, in S60, the first connecting unit 30 receives, from the portable terminal 8, the WFD channel value Vwfd which is identical to the non-WFD channel value Vap. Consequently, the channel judgment unit 38 judges YES in S60.

In the case of YES in S60, in S66 the first connecting unit 30 executes WPS negotiation for the client state. Thereby, the first connecting unit 30 establishes a WFD connection with the portable terminal 8 by using the WFD channel value Vwfd (i.e., the value identical to the non-WFD channel value Vap) received from the portable terminal 8. Since the non-WFD connection with the AP 4 has already been established, a state is formed in which both the non-WFD connection with the AP 4 and the WFD connection with the portable terminal 8 have been established. Thereby, the WFD connection process of FIG. 3 ends.

On the other hand, since the normal list is notified to the portable terminal 8 in the G/O negotiation of S50, in the case where the G/O negotiation of S50 has succeeded, the portable terminal 8 may determine the WFD channel value Vwfd as a value that is not identical to the non-WFD channel value yap. In this case, in S60 the first connecting unit 30 may receive, from the portable terminal 8, a WFD channel value Vwfd that is not identical to the non-WFD channel value Vap. Consequently, the channel judgment unit 38 may judge NO in S60.

In the case of NO in S60, in S62 the first connecting unit 30 displays, on the display unit 14, information indicating that the WFD connection cannot be established. In this case, the first connecting unit 30 does not establish a WFD connection with the portable terminal 8. Consequently, a state is maintained in which only the non-WFD connection with the AP 4 has been established. Here, also, a configuration is adopted which gives priority to the non-WFD network that is to remain constructed constantly. When S62 ends, the WFD connection process of FIG. 3 ends.

Figure 4:
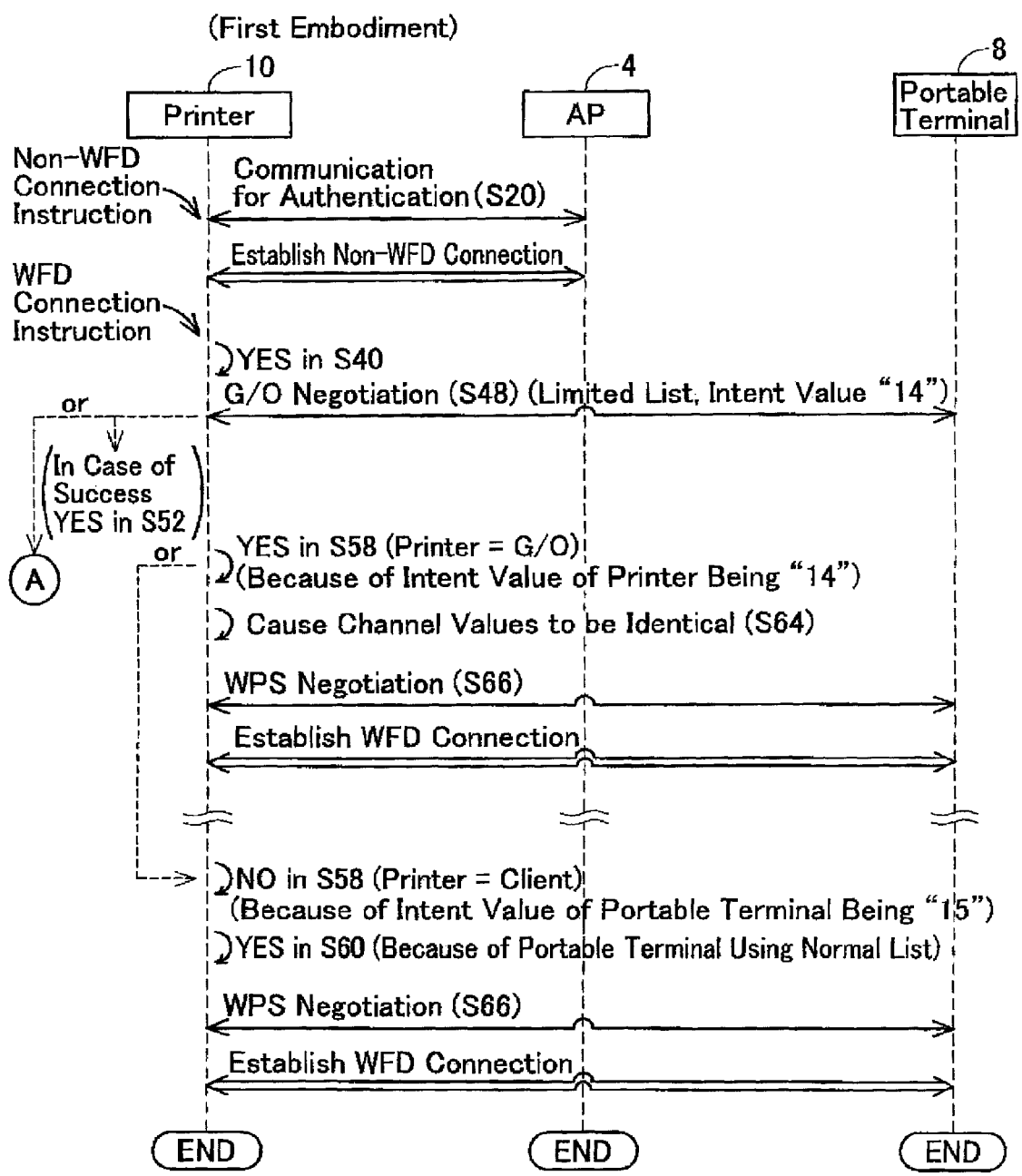
FIG. 4 shows a sequence diagram of a case realized by a first embodiment.
Figure 5:
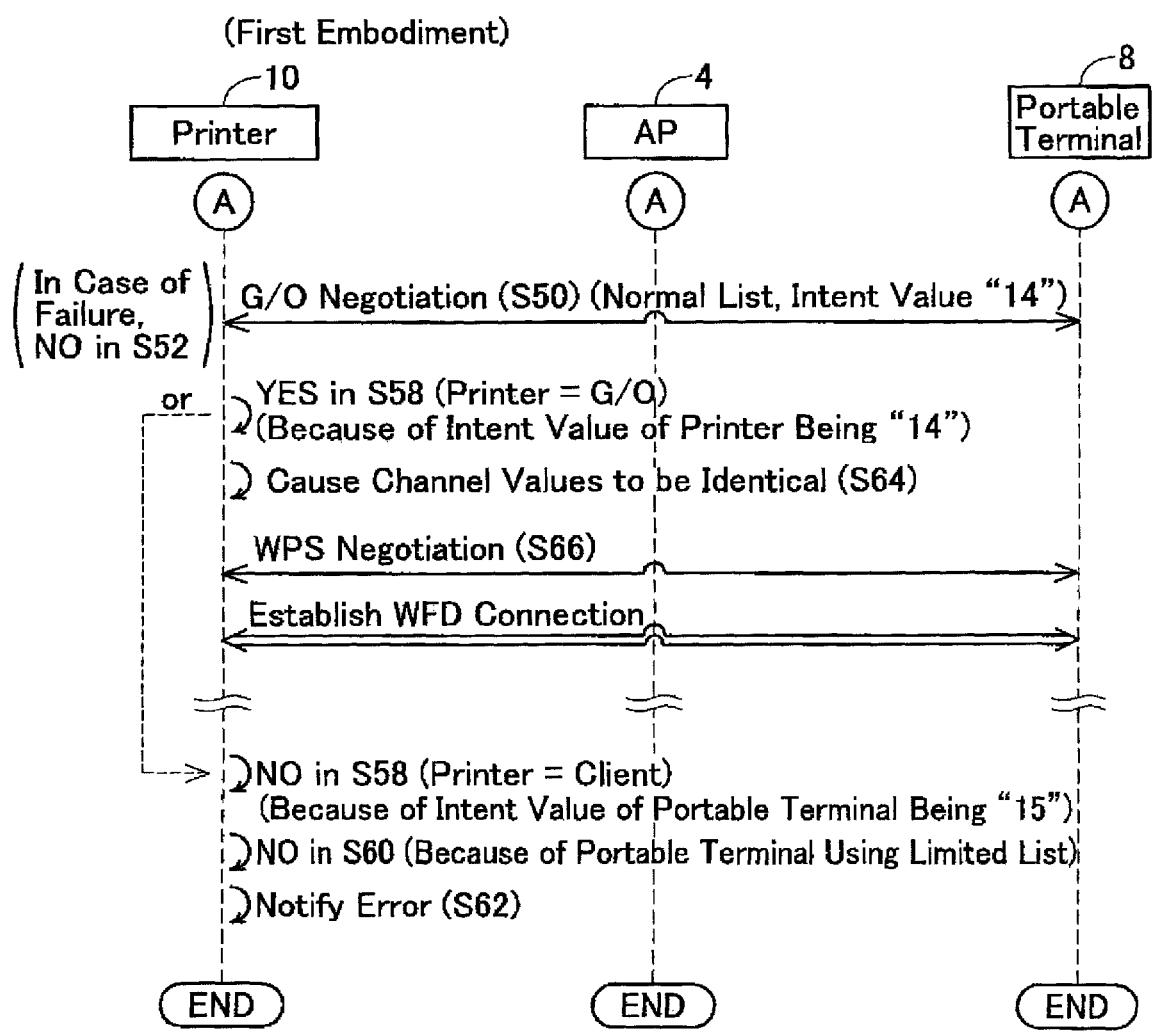
FIG. 5 shows a sequence diagram continued from FIG. 4.

(Specific Examples; FIG. 4 and FIG. 5)

Next, various cases of processes executed by the apparatuses 4, 8, 10 will be described with reference to FIG. 4 and FIG. 5. Moreover, the sequences of FIG. 4 and FIG. 5 are realized by the printer 10 executing processes in accordance with the flowcharts of FIG. 2 and FIG. 3.

The case of FIG. 4 shows a case in which a non-WFD connection is established between the printer 10 and the AP 4, and then a WFD connection is established between the printer 10 and the portable terminal 8.

When the non-WFD connection instruction is input to the printer 10, the printer 10 receives the non-WFD channel value Vap from the AP 4 (S13 of FIG. 2) and, using the received non-WFD channel value Vap, executes the communication for authentication (S20). Thereby, the non-WFD connection between the printer 10 and the AP 4 is established.

Next, when the WFD connection instruction is input to the printer 10, the printer 10 judges YES in S40 of FIG. 3, and executes the G/O negotiation of S48. Here, "14" is used as the Intent value of the printer 10, and the limited list including only the non-WFD channel value Vap is notified to the portable terminal 8.

When the G/O negotiation of S48 succeeds (YES in S52), the printer 10 usually determines that the printer 10 is to become the G/O. This is because "14" is used as the Intent value of the printer 10 in the G/O negotiation of S48. In this case, the printer 10 judges YES in S58 and, by referring to the non-WFD channel value Vap, determines the WFD channel value Vwfd that is identical to the non-WFD channel value Vap (S64).

Next, using the determined WFD channel value Vwfd, the printer 10 executes WPS negotiation for the G/O state (S66). Thereby, a WFD connection between the printer 10 and the portable terminal 8 is established. Consequently, a state is formed in which both the non-WFD connection with the AP 4 and the WFD connection with the portable terminal 8 have been established (called "multiple connection state" below).

On the other hand, even if the G/O negotiation of S48 succeeded (YES in S52), the printer 10 determines that the printer 10 is to become the client in the case where the Intent value of the portable terminal 8 is "15". In this case, the printer 10 judges NO in S58, but in S60 usually receives, from the portable terminal 8, the WFD channel value Vwfd which is identical to the non-WFD channel value Vap. This is because, in the G/O negotiation of S48, the limited list that includes only the non-WFD channel value Vap is notified to the portable terminal 8, and consequently the portable terminal 8 usually determines the WFD channel value Vwfd that is identical to the non-WFD channel value Vap. Consequently, the printer 10 judges YES in S60.

Next, using the received WFD channel value Vwfd (i.e., the value identical to the non-WFD channel value Vap), the printer 10 executes WPS negotiation for the client state (S66). Thereby, a WFD connection between the printer 10 and the portable terminal 8 is established. Consequently, a multiple connection state is formed.

For example, in the G/O negotiation of S48, in the case where the non-WFD channel value Vap is not included in the channel list of the portable terminal 8, the G/O negotiation of S48 fails (NO in S52). In this case, as shown in FIG. 5, the printer 10 executes the G/O negotiation of S50. Here, "14" is used as the Intent value of the printer 10, and the normal list that includes all the values 1 to 14 ch is notified to the portable terminal 8. Thereby, the G/O negotiation of S50 usually succeeds.

When the G/O negotiation of S50 succeeds (YES in S52), the printer 10 usually determines that the printer 10 is to become the G/O. This is because "14" is used as the Intent value of the printer 10 in the G/O negotiation of S50. In this case, the printer 10 judges YES in S58 and, by referring to the non-WFD channel value Vap, determines the WFD channel value Vwfd that is identical to the non-WFD channel value Vap (S64).

Next, using the determined WFD channel value Vwfd, the printer 10 executes WPS negotiation for the G/O state (S66). Thereby, a WFD connection between the printer 10 and the portable terminal 8 is established. Consequently, a multiple connection state is formed.

On the other hand, even if the G/O negotiation of S50 succeeded (YES in S52), the printer 10 determines that the printer 10 is to become the client in the case where the Intent value of the portable terminal 8 is "15". In this case, the printer 10 judges NO in S58 and usually receives, from the portable terminal 8, a WFD channel value Vwfd which is not identical to the non-WFD channel value Vap. This is because, in the G/O negotiation of S50, the normal list is notified to the portable terminal 8, and consequently the portable terminal 8 usually determines a WFD channel value Vwfd that is not identical to the non-WFD channel value Vap. Consequently, the printer 10 judges NO in S60.

Next, the printer 10 displays, on the display unit 14, information indicating that the WFD connection cannot be established (S62). In this case, the printer 10 does not establish the WFD connection with the portable terminal 8. However, the printer 10 maintains the non-WFD connection with the AP 4. Consequently, a state is formed in which only the non-WFD connection with the AP 4 has been established (called "single connection state" below).

Advantageous Effects of First Embodiment

As shown in the case of FIG. 4 and FIG. 5, in the case where the WED connection is to be established under a situation in which the non-WFD connection has been established, the printer 10 determines the WFD channel value Vwfd that is identical to the non-WFD channel value Vap by referring to the non-WFD channel value Vap. Thereby, the printer 10 can appropriately form the multiple connection state. Consequently, using the WFD connection, the printer 10 can receive the print data from the portable terminal 8 and, using the non-WFD connection, can receive the print data from the PC 6 via the AP 4.

Moreover, with the configuration of the wireless interface 18, the printer 10 cannot execute appropriate wireless communication using two different channel values. Consequently, as shown in the case of FIG. 5, in the case where the WFD connection is to be established under the situation in which the non-WFD connection has been established, if the printer 10 does not cause the WFD channel value Vwfd and the non-WFD channel value Vap to be identical, a single connection state is formed in which only the non-WFD connection is established. Further, as shown in the flowchart of FIG. 2, in the case where the non-WFD connection is to be established under the situation in which the WFD connection has been established (the case of YES in S14), the printer 10 disconnects the WFD connection, forming a single connection state in which only the non-WFD connection is established. Thereby, using the non-WFD connection, the printer 10 can appropriately receive the print data from the PC 6 via the AP 4. In particular, the printer 10 gives priority to the non-WFD connection that is to remain established constantly, forming the single connection state. Consequently, in the environment in which the printer 10 and the PC 6 are installed (e.g. within the specific company), the user of the PC 6 can prevent the occurrence of being unable to print using the printer 10. According to the present embodiment, the printer 10 can form an appropriate connection state.

Moreover, in the case where the WFD connection is to be established under a situation in which the non-WFD connection has not been established, the printer 10 uses the comparatively small Intent value "2" of the printer 10 (S42 of FIG. 3). Consequently, the printer 10 is more likely to be determined to become the client. Consequently, an increase in the processing load of the printer 10 can be prevented, and a WFD connection between the printer 10 and the portable terminal 8 can be established appropriately.

On the other hand, as shown in the case of FIG. 4 and FIG. 5, in the case where the WFD connection is to be established under a situation in which the non-WFD connection has been established, the printer 10 uses the comparatively large Intent value "14" of the printer 10 (S48 or S50 of FIG. 3). Consequently, the printer 10 has a high possibility of being determined to become the G/O. Consequently, by referring to the non-WFD channel value Yap, the printer 10 can appropriately determine the WFD channel value Vwfd which is identical to the non-WFD channel value Vap. Consequently, the printer 10 can appropriately form the multiple connection state.

Moreover, the printer 10 may notify the portable terminal 8 of the limited list even though it is determined that the printer 10 is to become the client (S48 of FIG. 3). Consequently, the printer 10 can receive, from the portable terminal 8, the WFD channel value Vwfd which is identical to the non-WFD channel value Vap (YES in S60). Consequently, the printer 10 can appropriately form the multiple connection state. Further, in the case where the G/O negotiation fails even though the printer 10 notifies the portable terminal 8 of the limited list (NO in S52), the printer 10 notifies the portable terminal 8 of the normal list that includes channel values different from the non-WFD channel value Yap (S50). Consequently, the G/O negotiation may succeed (YES in S52), and therefore the printer 10 may appropriately establish the WFD connection with the portable terminal 8.

(Corresponding Relationships)

The printer 10, the portable terminal 8, and the AP 4 are respectively examples of the "wireless communication device", the "first device", and the "second device". The G/O state and the client state are respectively examples of the "parent station state" and the "child station state". The G/O negotiation is an example of the "state determination process". The Intent value "2" and the Intent value "14" are respectively examples of the "first setting value" and the "second setting value". In S48 and S50 of FIG. 3, using "14" as the Intent value of the printer 10 is an example of the "particular process". The WFD connection and the non-WFD connection are respectively examples of the "first type of connection" and the "second type of connection". The WFD channel value Vwfd and the non-WFD channel value Vap are respectively examples of the "value of the first wireless channel" and the "value of the second wireless channel".

Second Embodiment

Figure 6:
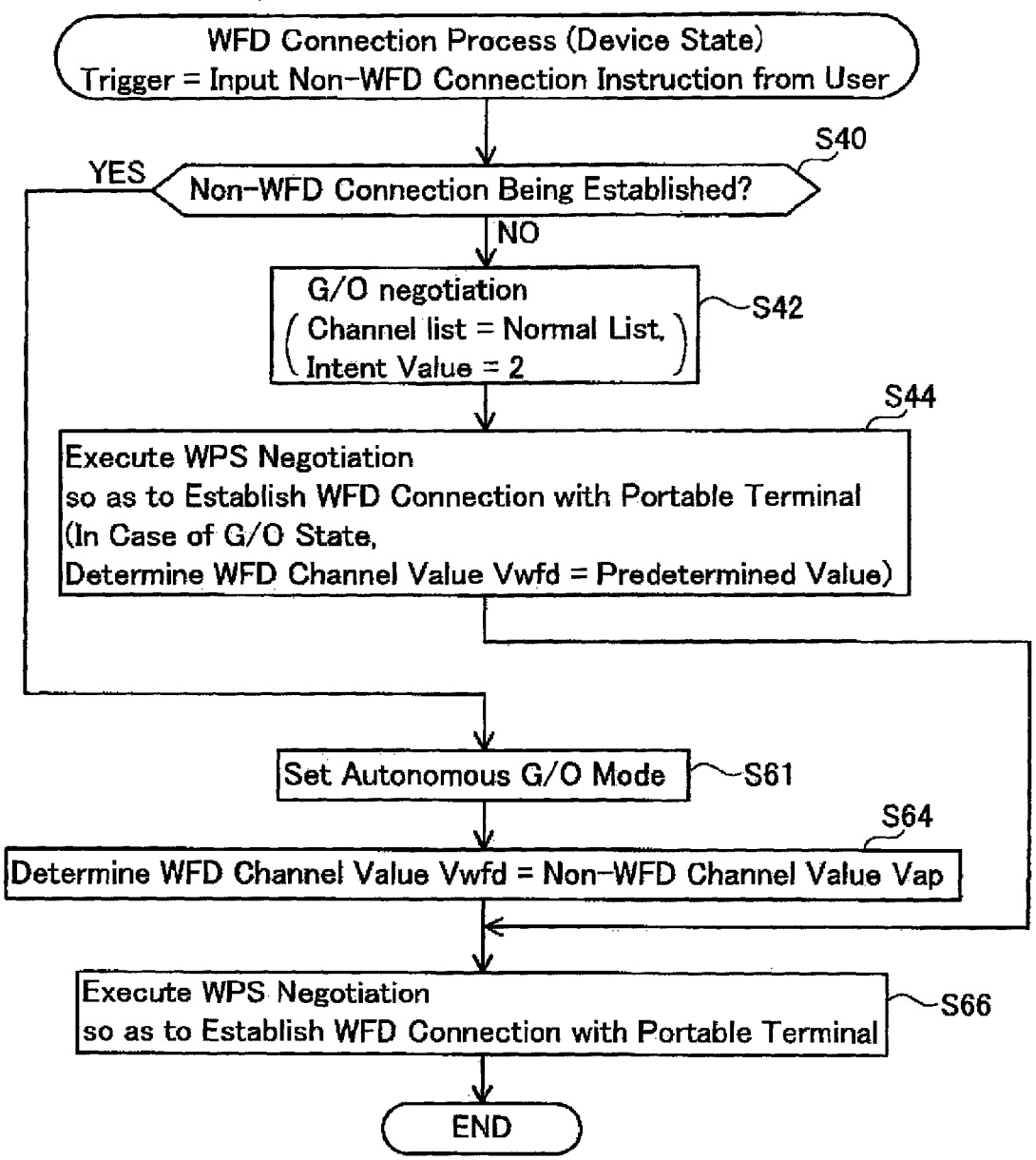
FIG. 6 shows a flowchart of a WFD connection process of a second embodiment.

Points differing from the first embodiment will be described. In the present embodiment, instead of the WFD connection process of FIG. 3, a WFD connection process of FIG. 6 is executed. S40 to S44 of FIG. 6 are the same as S40 to S44 of FIG. 3. In the case of YES in S40, in S61 the first connecting unit 30 sets the printer 10 to autonomous G/O mode. The autonomous G/O mode is a mode which keeps the printer 10 operating in the G/O state. Consequently, the WFD connection has not been established at the stage of S60, but the printer 10 is set in the G/O state. At this stage, identification information of the client state apparatus is not described in the administration list which is managed by the printer 10.

When the printer 10 has been set in the autonomous G/O mode in S60, the printer 10 does not execute G/O negotiation. As described above, in the case where the WFD connection instruction is input to the portable terminal 8, the portable terminal 8 executes a Search process for searching for client state apparatuses present in the surroundings of the portable terminal 8 and, additionally, executes a Scan process for searching for G/O state apparatuses (i.e., the printer 10) present in the surroundings of the portable terminal 8. Thereby, an apparatus list including information relating to the printer 10 is displayed on the display unit of the portable terminal 8. When the user of the portable terminal 8 selects the printer 10 that is in the G/O state from the apparatus list, the portable terminal 8 determines that the portable terminal 8 is to become the client without executing G/O negotiation.

Moreover, S64 and S66 of FIG. 6 are the same as S64 and S66 of FIG. 3. That is, in S64 the determination unit 34 determines the WFD channel value Vwfd that is identical to the non-WFD channel value Vap by referring to the non-WFD channel value Vap. Next, in S66 the first connecting unit 30 executes WPS negotiation for the G/O state by using the WFD channel value Vwfd. Thereby, a WFD connection between the printer 10 and the portable terminal 8 is established.

Figure 7:
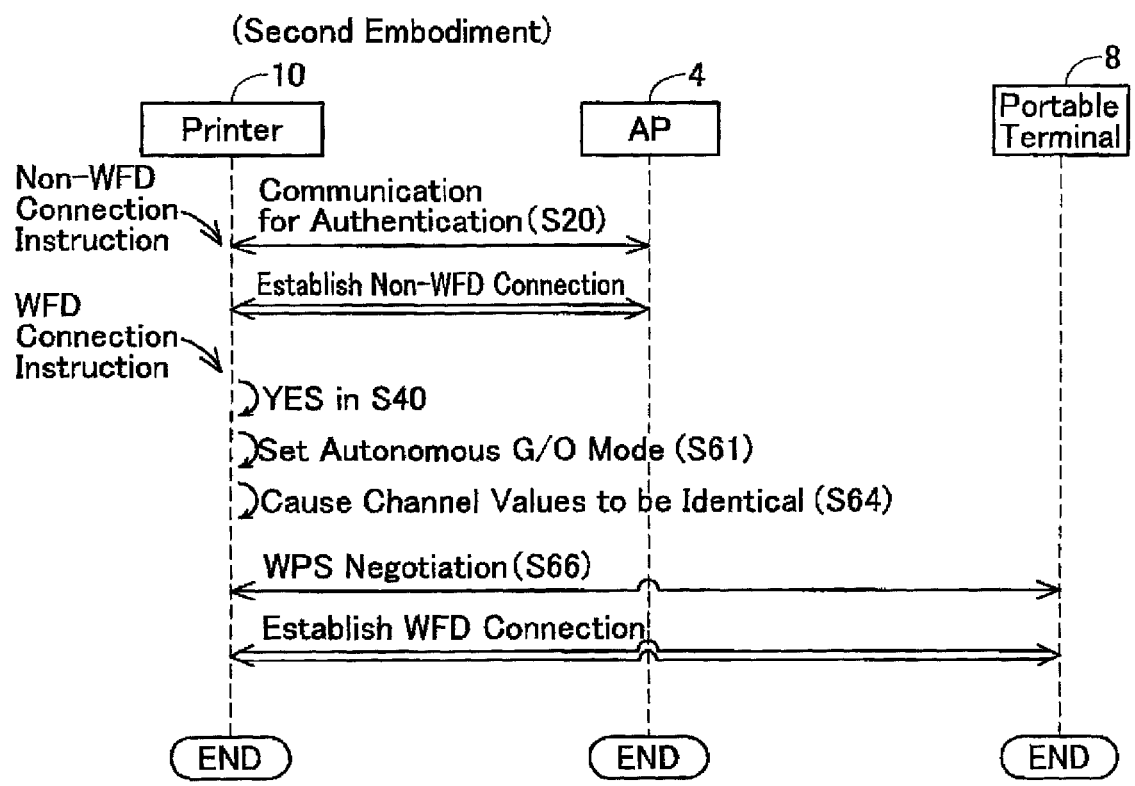
FIG. 7 shows a sequence diagram of a case realized by the second embodiment.

(Specific Example; FIG. 7)

In the present embodiment, the case of FIG. 7 is realized instead of the case of FIG. 4 and FIG. 5. The processes until the non-WFD connection is established are the same as the case of FIG. 4. However, as described above, in S61 of FIG. 6 the printer 10 sets the printer 10 to autonomous G/O mode. Consequently, by referring to the non-WFD channel value Vap, the printer 10 can determine the WFD channel value Vwfd that is identical to the non-WFD channel value Vap (S64). Next, using the WFD channel value Vwfd, the printer 10 executes WPS negotiation for the G/O state, and establishes a WFD connection with the portable terminal 8 (S66). Consequently, a multiple connection state is formed.

Advantageous Effects of Second Embodiment

As shown in the case of FIG. 7, in the case where the WFD connection is to be established under the situation in which the non-WFD connection has been established, the printer 10 sets the printer 10 to autonomous G/O mode. Consequently, by referring to the non-WFD channel value Vap, the printer 10 can appropriately determine the WFD channel value Vwfd that is identical to the non-WFD channel value Vap. Thereby, the printer 10 can appropriately form the multiple connection state. In the present embodiment, the autonomous G/O mode is an example of the "particular mode". Setting the printer 10 to the autonomous G/O mode in S61 of FIG. 6 is an example of the "particular process".

(Variant 1)

The "wireless communication device" is not restricted to the printer 10, but may be another apparatus capable of wireless communication (e.g., a portable terminal, PC, server, FAX device, copier, scanner, multi-function device, etc.). Further, the "first device" and the "second device" are not restricted to the portable terminal 8 and the AP 4, but may be another apparatus capable of wireless communication (e.g., a PC, server, printer, FAX device, copier, scanner, multi-function device, etc.).

(Variant 2)

The "parent station state" is not restricted to the WFD G/O state, but may be any state that manages other devices constituting the wireless network (e.g., manages a list of information relating to another device, relays wireless communication of another device, etc.). Further, the "child station state" is not restricted to the WFD client state, but may be any state managed by a parent station state apparatus. Consequently, the "first type of connection" is not restricted to the WFD connection, but may be another type of connection for the wireless communication device to selectively operate in one state from among the parent station state and the child station state.

(Variant 3)

The "second type of connection" is not restricted to the non-WFD connection with the AP 4, but may be e.g., a WFD connection with a PC, etc. That is, the "first type of connection" and the "second type of connection" may be the same type of connection. Further, the "second type of connection" may be e.g., an ad hoc connection with a PC, etc.

(Variant 4)

For example, in the case where the "second type of connection" is an ad hoc connection with the PC 6, any configuration of variants 4-1 to 4-3 below may be adopted.

(Variant 4-1)

A situation is assumed in which a WFD connection with the portable terminal 8 is to be established under a situation in which an ad hoc connection with the PC 6 has been established ("Vad" is being used as an ad hoc wireless channel value). For example, in the case where it is determined in the G/O negotiation that the printer 10 is to become the G/O, the determination unit 34 first determines the WFD channel value Vwfd and then, further, determines an ad hoc wireless channel value Vad' (Vad' being different from Vad) that is identical to the WFD channel value Vwfd. In this case, using the WFD channel value Vwfd, the first connecting unit 30 establishes a WFD connection with the portable terminal 8. Further, using the ad hoc wireless channel value Vad', the second connecting unit 32 re-establishes the ad hoc connection with the PC 6. That is, in general terms, in a case where a first type of connection is to be established with the first device under a situation in which the second type of connection has been established with the second device, the determination unit may determine both the value of the first wireless channel (Vwfd in the present variant) and the value of the second wireless channel (Vad' in the present variant).

(Variant 4-2)

A situation is assumed in which, in a state where an ad hoc connection with the PC 6 has been established ("Vad" is being used as the ad hoc wireless channel value), a WFD connection with the portable terminal 8 is to be established. For example, in the case where it is determined in the G/O negotiation that the printer 10 is to become the client, the first connecting unit 30 receives, from the portable terminal 8, the WFD channel value Vwfd determined by the portable terminal 8. Then the determination unit 34 may determine the ad hoc wireless channel value Vad' (Vad' being different from Vad) that is identical to the WFD channel value Vwfd. In this case, using the WFD channel value Vwfd, the first connecting unit 30 establishes a WFD connection with the portable terminal 8. Further, using the ad hoc wireless channel value Vad', the second connecting unit 32 re-establishes the ad hoc connection with the PC 6. That is, in general terms, in a case where the first type of connection is to be established with the first device under a situation in which the second type of connection has been established with the second device, the determination unit may determine the value of the second wireless channel (Vad' in the present variant).

(Variant 4-3)

A situation is assumed in which an ad hoc connection with the PC 6 is to be established under a situation in which a WFD connection with the portable terminal 8 has been established. In this case, the determination unit 34 may determine the ad hoc wireless channel value Vad that is identical to the WFD channel value Vwfd. In this case, using the ad hoc wireless channel value Vad, the second connecting unit 32 establishes an ad hoc connection with the PC 6. That is, in general terms, in a case where the second type of connection is to be established with the second device under a situation in which the first type of connection has been established with the first device, the determination unit may determine the value of the second wireless channel (Vad in the present variant).

As is clear from the first and second embodiments and the variants 4-1 to 4-3, in general terms, the determination unit may determine, in the specific case, the value of the first wireless channel, or the value of the second wireless channel, or both the values of the first and second wireless channels such that the value of the first wireless channel and the value of the second wireless channel are identical.

(Variant 5)

In the above embodiments, in the G/O negotiation (see S44, etc. of FIG. 3), the first connecting unit 30 determines that the printer 10 is to become the G/O in the case where the Intent value of the printer 10 is greater than the Intent value of the portable terminal 8. Instead, the first connecting unit 30 may determine that the printer 10 is to become the G/O in the case where the Intent value of the printer 10 is smaller than the Intent value of the portable terminal 8. In the first embodiment, the "second setting value" is a value greater than the "first setting value". However, in the present variant, the "second setting value" may be a value smaller than the "first setting value".

(Variant 6)

In the first embodiment, in S48, S50 of FIG. 3, the first connecting unit 30 uses "14" as the Intent value of the printer 10 so that the printer 10 has a high possibility of being determined to become the G/O. Instead, the first connecting unit 30 may receive, from the portable terminal 8, the Intent value of the portable terminal 8 before sending the Intent value of the printer 10 to the portable terminal 8. Thereupon, the first connecting unit 30 may determine the Intent value of the printer 10, which is greater than the Intent value of the portable terminal 8, and send the determined Intent value of the printer 10 to the portable terminal 8. In this case, also, the printer 10 has a high possibility of being determined to become the G/O. In the present variant, using the Intent value of the printer 10, which is greater than the Intent value of the portable terminal 8, is an example of the "particular process".

(Variant 7)

In the above embodiments, 1 ch to 14 ch is used as the range of the wireless channel value. This is the specification used in Japan. Instead, 1 ch to 11 ch (American specification) may be used, 1 ch to 13 ch may be used (European specification), or another range may be used as the range of the wireless channel value.

(Variant 8)

In the above embodiments, a configuration is adopted in which the first connecting unit 30 always disconnects the WFD connection when a non-WFD connection is to be established under a situation in which a WFD connection has been established (the case of YES in S14 of FIG. 2). Instead, in the above situation, the first connecting unit 30 may disconnect the WFD connection in the case where the printer 10 is operating in the client state. Further, in the above situation, the first connecting unit 30 may maintain the WFD connection without disconnection in the case where the printer 10 is operating in the G/O state and the WFD channel value currently being used in the WFD connection and the non-WFD channel value received in S13 of FIG. 2 are identical. Further, in the above situation, the first connecting unit 30 may disconnect the WFD connection in the case where the printer 10 is operating in the G/O state and the WFD channel value and the non-WFD channel value are not identical.

(Variant 9)

In the above embodiments, the units 30 to 38 are realized by the CPU 22 of the printer 10 executing processes according to software. Instead, parts or entireties of the units 30 to 38 may be realized by hardware such as a logic circuit, etc.

What is claimed is:

1. A wireless communication device configured to operate selectively in one of a plurality of states comprising a parent station state which functions as a parent station of a wireless network and a child station state which functions as a child station of the wireless network, the wireless communication device comprising:
a processor; and
a memory storing computer-readable instructions therein, the computer-readable instructions, when executed by the processor, causing the wireless communication device to perform:
executing a group owner negotiation, by using a first intent value that the wireless communication device stores and a particular intent value that another device stores, of determining that one of the wireless communication device and another device is to operate in the parent station state and determining that the other of the wireless communication device and the other device is to operate in the child station state;
establishing a first type of connection with the other device such that the wireless communication device operates in a state determined in the group owner negotiation, wherein in a case where the first type of connection with a first device is to be established, the first type of connection with the first device is established by using a first wireless channel, the first wireless channel being used in a communication between the wireless communication device and the first device;
establishing a second type of connection with another device, wherein in a case where the second type of connection with a second device different from the first device is to be established, the second type of connection with the second device is established by using a second wireless channel, the second wireless channel being used in a communication between the wireless communication device and the second device; and
determining at least one of a number of the first wireless channel and a number of the second wireless channel such that the number of the first wireless channel is identical to the number of the second wireless channel, in a specific case where one of the first type of connection with the first device and the second type of connection with the second device is to be established under a situation in which the other of the first type of connection with the first device and the second type of connection with the second device has been established.

2. The wireless communication device as in claim 1, wherein
the specific case is a case where the first type of connection with the first device is to be established under a situation in which the second type of connection with the second device has been established, and
the determining includes determining, in the specific case, the number of the first wireless channel by referring to the number of the second wireless channel being used in the second type of connection with the second device.

3. The wireless communication device as in claim 2, wherein
the executing includes executing, in the specific case, a particular process to cause the wireless communication device to operate in the parent station state, and
the determining includes determining, after the particular process, the number of the first wireless channel by referring to the number of the second wireless channel.

4. The wireless communication device as in claim 3, wherein
the group owner negotiation is executed by comparing the first intent value with an intent value that the first device stores, in a case where the first type of connection with the first device is to be established under a situation in which the second type of connection with the second device has not been established,
in the specific case, the group owner negotiation is executed by comparing a second intent value that the wireless communication device stores with an intent value that the first device stores, and
the second intent value is a value which is easier to be determined than the first intent value that the wireless communication device is to operate in the parent station state.

5. The wireless communication device as in claim 3, wherein
the executing includes executing, in the specific case, the particular process of setting the wireless communication device in a particular mode to keep the wireless communication device operating in the parent station state.

6. The wireless communication device as in claim 2, wherein
the determining further includes determining the number of the first wireless channel without referring to the number of the second channel in a case where the first type of connection with the first device is to be established under a situation in which the second type of connection with the second device has not been established.

7. The wireless communication device as in claim 1, wherein
the computer-readable instructions, when executed by the processor, cause the wireless communication device to further perform:
notifying, in the specific case, the first device of only the number of the second wireless channel as a number of an available wireless channel for the wireless communication device.

8. The wireless communication device as in claim 7, wherein
the notifying further includes notifying the first device of a value different from the number of the second wireless channel as a number of the available wireless channel for the wireless communication device, in a case where the wireless communication device cannot establish the first type of connection with the first device after notifying the first device of only the number of the second wireless channel.

9. The wireless communication device as in claim 1, wherein
in the specific case and in a case where it is determined that the wireless communication device is to operate in the parent station state, the determining includes determining the number of the first wireless channel by referring to the number of the second wireless channel,
the computer-readable instructions, when executed by the processor, cause the wireless communication device to further perform:
judging whether the number of the first wireless channel and the number of the second wireless channel are identical or not in the specific case and in a case where it is determined that the wireless communication device is to operate in the child station state, wherein the executing includes establishing the first type of connection with the first device by using the first wireless channel in a case where it is judged that the number of the first wireless channel and the number of the second wireless channel are identical.

10. The wireless communication device as in claim 1, wherein the second device is an access point.

11. The wireless communication device as in claim 10, wherein
the number of the second wireless channel is a number determined by the access point.

12. A non-transitory computer-readable storage medium storing computer-readable instructions for a wireless communication device configured to operate selectively in one of a plurality of states comprising a parent station state which functions as a parent station of a wireless network and a child station state which functions as a child station of the wireless network,
the computer-readable instructions, when executed by a processor of the wireless communication device, cause the wireless communication device to perform:
executing a group owner negotiation, by using a first intent value that the wireless communication device stores and a particular intent value that another device stores, of determining that one of the wireless communication device and another device is to operate in the parent station state and determining that the other of the wireless communication device and the other device is to operate in the child station state;
establishing a first type of connection with the other device such that the wireless communication device operates in a state determined in the group owner negotiation, wherein in a case where the first type of connection with a first device is to be established, the first type of connection with the first device is established by using a first wireless channel, the first wireless channel being used in a communication between the wireless communication device and the first device;
establishing a second type of connection with another device, wherein in a case where the second type of connection with a second device different from the first device is to be established, the second type of connection with the second device is established by using a second wireless channel, the second wireless channel being used in a communication between the wireless communication device and the second device; and
determining at least one of a number of the first wireless channel and a number of the second wireless channel such that the number of the first wireless channel is identical to the number of the second wireless channel, in a specific case where one of the first type of connection with the first device and the second type of connection with the second device is to be established under a situation in which the other of the first type of connection with the first device and the second type of connection with the second device has been established.

13. A wireless communication device comprising:
a processor; and
a memory storing computer-readable instructions therein, the computer-readable instructions, when executed by the processor, causing the wireless communication decide to perform:
establishing a connection with an access point so as to belong to a first wireless network formed by the access point which determines a number of a wireless channel, the first wireless network using the number of the wireless channel determined by the access point, the wireless channel determined by the access point being used in a communication between the wireless communication device and the access point;
receiving an instruction for establishing a connection with a particular device while the connection with the access point has been established, the particular device being different from the access point; and
in response to receiving the instruction, establishing the connection with the particular device so as to belong to a second wireless network in which the wireless communication device operates in a parent station state, the second wireless network using a number of wireless channel being identical to the number of the wireless channel determined by the access point, the wireless channel used in the second wireless network being used in a communication between the wireless communication device and the particular device.

14. The wireless communication device as in claim 13, further comprising
one interface chip being used for establishing the connection with the access point and being used for establishing the connection with the particular device.

15. The wireless communication device as in claim 13, wherein,
the memory configured to store:
a first wireless profile used in the first wireless network; and
a second wireless profile used in the second wireless network, the second wireless profile being different from the first wireless profile and
the first wireless network is different from the second wireless network.

16. The wireless communication device as in claim 13, wherein
the establishing of the connection with the particular device includes, in response to receiving the instruction, changing autonomously from a particular state to the parent station state.

17. The wireless communication device as in claim 16, wherein
the establishing of the connection with the particular device includes determining, after changing to the parent station state, the number of the wireless channel used in the second wireless network by using the number of the wireless channel determined by the access point.

18. The wireless communication device as in claim 13, wherein
the parent station state is a group owner state in a Wi-Fi Direct scheme.

* * * * *